United States Patent [19]

de Buda

[11] Patent Number: 4,666,688

[45] Date of Patent: May 19, 1987

[54] METHOD FOR RECOVERY AND CONVERSION OF STRONTIUM SULFATE TO STRONTIUM CARBONATE FROM LOW AND MEDIUM GRADE CELESTITE ORES

[75] Inventor: Francis de Buda, Taft, Calif.

[73] Assignee: Excel-Mineral Company, Inc., Goleta, Calif.

[21] Appl. No.: 825,398

[22] Filed: Feb. 3, 1986

[51] Int. Cl.⁴ ............ C01F 11/18; C01F 11/28; C01F 11/46; B01D 11/00

[52] U.S. Cl. ............... 423/165; 423/163; 423/170; 423/431; 423/658.5

[58] Field of Search ........... 423/162, 163, 165, 170, 423/431, 658.5

[56] References Cited

U.S. PATENT DOCUMENTS

| | | | |
|---|---|---|---|
| 278,283 | 5/1883 | Sidersky et al. | 423/165 |
| 280,172 | 6/1883 | Grouven | 423/165 |
| 301,383 | 7/1884 | Mebus et al. | 423/431 |
| 1,067,595 | 7/1913 | Ekstrom | 423/165 |
| 1,782,830 | 11/1930 | Pierce, Jr. | 423/165 |
| 1,936,806 | 11/1933 | Thomas | 423/165 |
| 1,968,737 | 7/1934 | Borrodalie | 423/163 |
| 2,035,366 | 3/1936 | Elledge et al. | 423/165 |
| 2,509,585 | 5/1950 | Brown | 423/170 |
| 3,029,133 | 4/1962 | Goodenough | 423/163 |
| 3,333,919 | 8/1967 | Buckingham | 423/165 |
| 3,343,914 | 9/1967 | Bray | 423/165 |
| 3,743,691 | 7/1973 | Trew | 423/165 |
| 4,337,233 | 6/1982 | Chiang et al. | 423/297 |
| 4,421,729 | 12/1983 | Chiang et al. | 423/165 |
| 4,495,160 | 1/1985 | Moote et al. | 423/165 |

FOREIGN PATENT DOCUMENTS

| | | | |
|---|---|---|---|
| 26241 | 7/1883 | Fed. Rep. of Germany | 423/165 |
| 55-23055 | 2/1980 | Japan | 423/431 |
| 232 | 1/1883 | United Kingdom | 423/165 |
| 346404 | 4/1931 | United Kingdom . | |
| 497823 | 2/1974 | U.S.S.R. . | |
| 522135 | 12/1974 | U.S.S.R. . | |
| 565877 | 8/1977 | U.S.S.R. | 423/431 |

*Primary Examiner*—Gary P. Straub
*Attorney, Agent, or Firm*—Poms, Smith, Lande & Rose

[57] ABSTRACT

Essentially pure strontium carbonate is recovered from low to medium grade strontium sulfate containing ores by first treating the ore with a hydrochloric acid solution to remove extraneous materials including calcium, magnesium, barium, and iron. The remaining strontium sulfate containing residue is treated with ammonium carbonate to produce insoluble strontium carbonate and soluble ammonium sulfate. The strontium carbonate then is converted to soluble strontium chloride through treatment with a second, stronger hydrochloric acid solution. Any remaining extraneous barium or iron is removed from the second acid solution before the strontium chloride is reconverted to insoluble strontium carbonate and precipitated out of solution for recovery.

10 Claims, No Drawings

METHOD FOR RECOVERY AND CONVERSION OF STRONTIUM SULFATE TO STRONTIUM CARBONATE FROM LOW AND MEDIUM GRADE CELESTITE ORES

FIELD OF THE INVENTION

The present invention relates generally to the recovery of strontium from low to medium grade celestite ores and the like. More particularly, the present invention is directed to a method for economically recovering substantially pure strontium carbonate from low to medium grade celestite ores containing strontium sulfate and significant quantities of extraneous materials. This result is achieved without prior beneficiation of the ore.

BACKGROUND OF THE INVENTION

Strontium is a relatively rare alkaline-earth metal commonly found as insoluble sulfate, carbonate, silicate and phosphate deposits in the earth's crust. Typically, strontium is recovered from celestite ores which contain strontium sulfate. The strontium sulfate is usually converted to the carbonate form which finds a variety of uses in the electronics and glass industries, particularly glass for use in television tubes where low transmission of x-rays is desired. Other strontium compounds which can be produced from strontium carbonate find uses in the pyrotechnics, chemical, and pharmaceutical industries.

From a practical standpoint, economically producing strontium carbonate of sufficient purity for utilization in the electronics and glass industries requires relatively high grade strontium bearing ore as a starting material. For example, imported celestite ores from Scotland are known to contain up to 98% strontium sulfate. Lower grade ores containing approximately 80-85% strontium sulfate are commonly treated with a prior beneficiation or purifying step such as floatation of the ore to achieve the requisite degree of purity prior to processing.

The most common commercial process for producing strontium carbonate from celestite ore is the "black ash" process in which ground celestite ore is mixed with finely divided carbon and the mixture calcined at elevated temperatures of about 1000° C. to produce strontium sulfide (SrS), carbon dioxide ($CO_2$) and carbon monoxide (CO). The water soluble strontium sulfide so produced is leached from the black ash calcination product with hot water and the solid impurities are removed by settling and filtration. The dissolved strontium sulfide is converted to strontium carbonate with either sodium carbonate ($Na_2CO_3$) or carbon dioxide or both. The strontium carbonate so produced precipitates from the aqueous solution and is recovered and dried using conventional separation techniques.

Though commercially successful, the "black ash" process has disadvantages including the requirement of significantly elevated process temperatures and the disposal of undesirable reactant byproducts such as sodium sulfide ($Na_2S$) produced when sodium carbonate is the carbonating compound or hydrogen sulfide ($H_2S$) produced when carbon dioxide is the carbonate source.

Alternatively, strontium carbonate can be produced directly in a metathesis reaction by digesting relatively high grade celestite ore with soda ash solutions at elevated temperatures. However, little purification takes place in this process so high purity products cannot be obtained from low or medium grade areas.

These known prior art processes become uneconomical when low or medium grade ores are utilized as starting materials. Low grade ores commonly contain undesirable extraneous materials such as barium, magnesium, calcium, iron and aluminum as well as silicates silicon dioxide and clays. Barium and iron are particularly troublesome extraneous materials because they are difficult to separate from the desired strontium product and hence interfere with the production of high purity strontium carbonate.

Accordingly, one of the objects of the present invention is to provide an economical process for producing substantially pure strontium carbonate from low and medium grade celestite ore. A further object of the present invention is to produce substantially pure strontium carbonate from such ores without the need for elevated temperatures or with the production of undesirable waste products.

SUMMARY OF THE INVENTION

These and other objects are achieved by the method of the present invention which produces substantially pure strontium carbonate from low to medium grade celestite ores which are highly complexed with calcium, barium, iron and other interfering extraneous materials. Additionally, the method of the present invention produces ammonium sulfate as a desirable byproduct which is useful in agricultural areas as a fertilizer.

According to the present invention, strontium sulfate is recovered and converted to strontium carbonate by:

(a) removing most extraneous materials from the pulverized celestite ore with a hydrochloric acid wash which converts calcium, magnesium, barium, iron and other carbonates to soluble chlorides;

(b) treating the residual strontium sulfate with ammonium carbonate to produce insoluble strontium carbonate and soluble ammonium sulfate;

(c) treating the strontium carbonate with a second, stronger hydrochloric acid solution to convert the strontium carbonate and any remaining extraneous materials to soluble chloride forms;

(d) removing any remaining extraneous barium or iron from the hydrochloric acid solution, if present; and (e) treating the remaining solution with ammonium carbonate to produce additional ammonium sulfate and substantially pure, insoluble, strontium carbonate precipitate.

A further understanding of the method of the present invention will be provided to those skilled in the art by the following detailed description.

DETAILED DESCRIPTION

It is among the advantages of the present invention that a substantially pure, high grade strontium carbonate product is produced from low to medium grade ores which, up to the present time, have been uneconomical to mine due to substantial strontium recovery expenses. Additionally, rather than producing undesirable byproducts and pollutants, the method of the present invention produces ammonium sulfate which has desired utility as an agricultural fertilizer.

Unlike high grade imported celestite ores which are known to contain up to 98% strontium sulfate, strontium ores in the Barstow, California area are known to be of medium to low grade with only approximately 40% to 60% strontium sulfate content by weight. Additionally, it is not uncommon for the strontium sulfate contained in these ores to be highly complexed with calcium, barium, iron and other extraneous materials. Because of its chemical similarity to strontium, barium presents particular difficulties due to chemical interference when trying to recover pure strontium products. Iron is another element which is particularly difficult to remove and hence constitutes an undesirable extraneous material. Moreover, the relatively high calcium content in such ores makes it expensive and difficult to upgrade the quality of the ores with a prior beneficiation step such as floatation treatment. Accordingly, such low to medium grade ores do not lend themselves to the economic recovery of strontium by the usual prior art processes.

For example, while it is possible to produce 95% by weight strontium carbonate utilizing the "black ash" process, this requires starting materials containing approximately 85% by weight strontium sulfate. Similarly, to produce a product containing over 95% by weight strontium carbonate by the metathesis reaction wherein strontium sulfate is added to a solution of sodium carbonate to directly produce strontium carbonate, the starting material fed to the reaction must contain about 95% by weight strontium sulfate because little purification takes place during the process. Thus, these known reactions require high grade ores or significant beneficiation prior to initiating the recovery process.

In contrast to these prior art methods and their need for relatively high grade strontium bearing ores as feed stocks, the method of the present invention produces substantially pure strontium carbonate (99%+ pure) from low grade ores having only approximately 40% to 60% strontium sulfate without prior beneficiation of the ore.

In essence, the method of the present invention utilizes a double hydrochloric acid treatment to preferentially remove undesirable extraneous materials from the ore. The first hydrochloric acid treatment removes most calcium, magnesium, barium, iron and other carbonates. The second hydrochloric acid treatment with a stronger acid solution extracts strontium, previously converted to an insoluble carbonate, from the residue and places it into solution as a soluble chloride. Any remaining barium or iron contaminants are selectively removed from this second solution prior to the precipitation of substantially pure strontium carbonate. Thus, by taking advantage of the relative solubilities it is possible to convert the undesired extraneous materials to soluble chloride forms which can be separated from insoluble strontium compounds.

The method of the present invention also utilizes two separate carbonate conversion steps, each preferably utilizing ammonium carbonate as the carbonate source. In this manner, the strontium sulfate originally present in the celestite ore is both recovered and converted to the desired strontium carbonate form while useful ammonium sulfate is produced as a byproduct.

It will be appreciated that the method of the present invention is carried out at atmospheric pressure and room temperature. However, it should be emphasized that this is not a limitation to the method of the present invention. Rather, while it is contemplated as being within the scope of the present invention to increase or decrease the pressure or temperature under which the various steps take place, it is preferred that atmospheric pressure and room temperature be utilized as this significantly increases the economics of the method of the present invention relative to the high temperature, calcining methods of the prior art.

The celestite ore that is utilized as a feed stock for the method of the present invention is a low to medium grade natural ore preferably containing approximately 40% to 60% strontium sulfate by weight. Strontium sulfate containing ores other than celestite, as well as waste or tailings containing strontium sulfate are also contemplated as suitable feed stocks. Additionally, while strontium sulfate content is preferably about 40% to 60%, higher strontium contents up to approximately 80% are also contemplated as being within the scope of the present invention. However, it should be emphasized that the method of the present invention is most suitable for low or medium grade ores. All such strontium sulfate containing materials are intended to be included in the definition of "celestite ore" suitable for use in the practice of the method of the present invention.

The celestite ore is preferably utilized in a crushed or pulverized form in order to provide adequate surface area for satisfactory dissolution and reaction. Accordingly, where necessary the ore is crushed or ground to produce a desired particle size preferably ranging from an average of 1–150 microns. For example, grinding the ore for 2½ hours in a rotary ball mill is sufficient for these purposes. Though other pulverizing methods and times are contemplated as being within the scope of the present invention, excessively fine grinds of celestite ore are unnecessary.

The comminuted material is treated with a first hydrochloric acid solution until effervescing stops. The hydrochloric acid utilized for this treatment is preferably about 10% to 12% hydrochloric acid. This treatment removes most of the extraneous materials such as calcium, magnesium, barium and other carbonates by converting them into soluble chlorides which remain in solution. The relatively insoluble strontium sulfate remains in the residue. In this manner, most of the undesirable extraneous materials that would interfere with later steps in the method of the present invention are removed with the acid solution.

The hydrochloric acid solution so formed is removed from the residue through filtration or other separation techniques. The acid solution can be filtered off by any of the usual filtration methods, including rotary vacuum filtration.

The strontium sulfate containing residue is washed and then treated with ammonium carbonate added in a slight excess to the stoichiometric value of the strontium sulfate present in the celestite ore. This treatment converts the strontium sulfate into strontium carbonate which, being relatively insoluble, remains out of solution. The sulfate originally present as strontium sulfate is converted to ammonium sulfate which remains in solution. The excess ammonium carbonate solution and the ammonium sulfate contained therein are separated from the residue through filtration or other separation techniques as in the previous step.

The strontium carbonate containing residue so produced is washed with water. The resulting filter cake, while containing the desired strontium carbonate also contains extraneous materials such as silicates, clays, and, where present in the original celestite ore, residual iron and barium compounds.

To extract the strontium carbonate from this residue, the residue is treated with a second, stronger hydrochloric acid solution. Preferably, this second hydrochloric acid solution will be approximately 18% hydrochloric acid or 6 Normal. Those skilled in the art will appreciate that this reaction takes place with considerable effervescence. As a result of this treatment, the insoluble strontium carbonate is placed into the hydrochloric acid solution as a soluble chloride. This solution is separated from the insoluble residue through filtration or other separation techniques and the residue is discarded.

The resultant strontium containing hydrochloric acid solution also may contain residual amounts of undesirable barium and iron if these elements were originally present in the raw celestite ore. Accordingly, prior to recovery of the strontium, if present, barium and iron are removed from this solution. Preferably, to accomplish this removal the acid solution filtrate is examined for the presence of iron or barium as is known in the art and, as is often the case with Barstow area ore, where no barium or iron is present, the acid solution is treated with ammonium carbonate until precipitation of strontium carbonate occurs. The insoluble strontium carbonate so produced is of very high purity, being greater than 99% strontium carbonate by weight. This precipitate is separated from the supernatant liquid through filtration or other means, washed with water, and dried by conventional means to produce substantially pure strontium carbonate suitable for use in glass and electronics.

If, however, iron or barium are detected in the second acid solution after treatment of the strontium carbonate containing residue, these compounds are selectively removed from the solution prior to the precipitation of the desired strontium carbonate product. The removal of these undesirable extraneous materials is preferably accomplished in the following manner. First, the hydrochloric acid solution is neutralized with ammonia and brought to a pH greater than 9. At this point, iron compounds contained in the acid solution become insoluble and can be removed thorough subsequent filtration. The strontium then can be precipitated as discussed above. However, if barium is also detected in the solution, it is removed subsequently by taking the filtered neutralized solution from which the iron compounds have been removed and treating this with a soluble chromate or dichromate compound such as potassium dichromate. This treatment converts the barium into an insoluble chromate form which can be removed from the solution by simple filtration or centrifugation. The remaining liquid filtrate then is treated with ammonium carbonate as discussed above to precipitate the substantially pure strontium carbonate.

Accordingly, through the method of the present invention strontium carbonate products with a purity greater than 99% and practically approaching 99.9% purity can be obtained from low or medium grade celestite ores even in the presence of barium and iron without prior beneficiation or purification of the ore. An additional important advantage of the present invention is that rather than producing toxic byproducts as in the prior art processes, the method of the present invention produces ammonium sulfate which is useful as a fertilizer. Thus, an additional valuable product is produced by the method of the present invention and a potential costly waste problem is eliminated.

It is to be understood that the method of the present invention is not to be limited to that expressly as disclosed and described herein. Different grades of celestite ore feed stock and modifications to the reaction conditions as described above may be made within the spirit of the present invention and all such changes and modifications coming within the scope of the appended claims are embraced thereby.

I claim:

1. A method for the efficient recovery and conversion of strontium sulfate into strontium carbonate from low to medium grade ores having a strontium sulfate content of less than 80% by weight complexed with extraneous materials containing at least one of the group consisting of calcium, magnesium, barium, iron, and aluminum, said method comprising the steps of:
   - treating said ore with a sufficient volume of a first hydrochloric acid solution to remove the majority of the hydrochloric acid soluble forms of said extraneous materials from said ore through conversion to soluble chloride forms dissolved in said first hydrochloric acid solution;
   - removing said hydrochloric acid solution and said dissolved soluble chloride forms of said extraneous materials to produce a strontium sulfate containing residue;
   - treating said strontium sulfate containing residue with a sufficient amount of an ammonium carbonate solution to produce strontium carbonate and soluble ammonium sulfate dissolved in said ammonium carbonate solution;
   - removing said ammonium carbonate solution and said dissolved soluble ammonium sulfate to produce a strontium carbonate containing residue;
   - treating said strontium carbonate containing residue with a sufficient volume of a second stronger hydrochloric acid solution to convert said strontium carbonate to soluble strontium chloride dissolved in said second stronger hydrochloric acid solution;
   - separating said dissolved strontium chloride containing second stronger hydrochloric acid solution from the remaining insoluble components of said residue;
   - examining said dissolved strontium chloride containing second stronger hydrochloric acid solution for the presence of barium and iron.
   - if present in quantities exceeding the solubility product of barium sulfate or iron hydroxide, removing said barium or iron from said dissolved strontium chloride containing second stronger hydrochloric acid solution through conversion to insoluble barium or iron compounds; and
   - treating said second stronger hydrochloric acid solution with ammonium carbonate to produce substantially pure, insoluble strontium carbonate precipitate.

2. The method of claim 1 wherein the initial concentration of said first hydrochloric acid solution is about 10% to about 12% hydrochloric acid.

3. The method of claim 2 wherein the initial concentration of said second stronger hydrochloric acid solution is about 18% hydrochloric acid.

4. The method of claim 1 wherein said ammonium carbonate is added in slight excess to the stoichiometric value of the strontium sulfate present in said ore.

5. The method of claim 1 wherein said iron is removed from said dissolved strontium chloride containing second stronger hydrochloric acid solution through the additional steps of:

neutralizing said solution with ammonia;

raising the pH of said neutralized solution to 9 or more to form insoluble iron compounds; and separating said insoluble iron compounds from said solution.

6. The method of claim 5 wherein said barium is removed from said dissolved strontium chloride containing second stronger hydrochloric acid solution through the additional steps of:

treating said solution with an effective amount of a soluble chromate containing compound to produce insoluble barium chromate; and separating said insoluble barium chromate from said solution.

7. The method of claim 1 wherein said barium is removed from said dissolved strontium chloride containing second stronger hydrochloric solution through the additional steps of:

neutralizing said solution with ammonia;

raising the pH of said solution to 9 or above; and treating said solution with an effective amount of a soluble chromate containing compound to produce insoluble barium chromate; and separating said insoluble barium chromate from said solution.

8. A method for the efficient recovery and conversion of strontium sulfate to strontium carbonate from low to medium grade ores having a strontium sulfate content of less than 80% by weight complexed with extraneous materials containing at least one of the group consisting of calcium, magnesium, barium, iron and aluminum, said method comprising the steps of:

treating said ore with a sufficient volume of a hydrochloric acid solution to convert the majority of the hydrochloric and soluble forms of said extraneous materials that may be present into soluble chloride forms dissolved in said hydrochloric acid solution;

filtering off said hydrochloric acid solution and dissolved soluble chlorides contained therein to produce a strontium sulfate containing residue;

treating said strontium sulfate containing reside with a sufficient volume of an ammonium carbonate solution to produce insoluble strontium carbonate and soluble ammonium sulfate solution;

filtering off said ammonium sulfate solution to produce a strontium carbonate containing residue;

treating said strontium carbonate containing residue with a sufficient volume of a second, stronger hydrochloric acid solution to convert said strontium carbonate into soluble strontium chloride dissolved in said second stronger hydrochloric acid solution;

filtering off said second, stronger hydrochloric acid solution and said soluble strontium chloride contained therein;

examining said strontium chloride containing second stronger hydrochloric acid solution for the presence of barium and iron;

if present in quantities exceeding the solubility product of barium sulfate or iron hydroxide, removing said barium or iron from said strontium chloride containing second stronger hydrochloric acid solution through conversion to insoluble barium or iron compounds; and treating said strontium chloride containing second stronger hydrochloric acid solution with an effective amount of ammonium carbonate to reconvert said strontium chloride to insoluble strontium carbonate; and recovering said insoluble strontium carbonate.

9. The method of claim 8 wherein said iron is removed from said strontium chloride containing second stronger hydrochloric acid solution through the additional steps of:

neutralizing said solution with ammonia;

raising the pH of said neutralized solution to 9 or more to form insoluble iron compounds; and separating said insoluble iron compounds form said solution.

10. The method of claim 9 wherein said barium is removed from said strontium chloride containing second, stronger hydrochloric acid solution through the additional steps of:

treating said solution with an effective amount of a soluble chromate containing compound to produce insoluble barium chromate; and separating said insoluble barium chromate from said solution.

* * * * *